(12) United States Patent
Coady

(10) Patent No.: US 12,031,506 B2
(45) Date of Patent: Jul. 9, 2024

(54) VALVE TIMING SYSTEM FOR LIQUID FUEL ROCKETS

(71) Applicant: Aerojet Rocketdyne, Inc., Sacramento, CA (US)

(72) Inventor: Larry Coady, Sacramento, CA (US)

(73) Assignee: AEROJET ROCKETDYNE, INC., Sacramento, CA (US)

( * ) Notice: Subject to any disclaimer, the term of this patent is extended or adjusted under 35 U.S.C. 154(b) by 187 days.

(21) Appl. No.: 17/770,156

(22) PCT Filed: Dec. 10, 2019

(86) PCT No.: PCT/US2019/065420
§ 371 (c)(1),
(2) Date: Apr. 19, 2022

(87) PCT Pub. No.: WO2021/118536
PCT Pub. Date: Jun. 17, 2021

(65) Prior Publication Data
US 2022/0389885 A1 Dec. 8, 2022

(51) Int. Cl.
*F02K 9/58* (2006.01)
(52) U.S. Cl.
CPC ............ *F02K 9/58* (2013.01); *F05D 2260/42* (2013.01); *F05D 2270/301* (2013.01); *F05D 2270/52* (2013.01)
(58) Field of Classification Search
CPC ........................................................ F02K 9/58
See application file for complete search history.

(56) References Cited

U.S. PATENT DOCUMENTS

| | | | | |
|---|---|---|---|---|
| 7,309,025 B2* | 12/2007 | Yamazaki | ............... | F02D 41/20 239/69 |
| 9,523,323 B2* | 12/2016 | Nestoriuc | ............. | F02D 41/221 |
| 2008/0236140 A1* | 10/2008 | Brady | ........................ | F02K 7/02 60/250 |
| 2015/0128597 A1* | 5/2015 | Schlak | ...................... | F02C 3/08 60/719 |
| 2015/0167574 A1* | 6/2015 | Nestoriuc | ............. | F02D 41/221 701/32.8 |
| 2015/0251766 A1* | 9/2015 | Atkey | ..................... | F25B 27/00 60/785 |

(Continued)

OTHER PUBLICATIONS

International Preliminary Report on Patentability for International Patent Application No. PCT/US2019/065420 issued on May 17, 2022.

(Continued)

*Primary Examiner* — Kyle Robert Thomas
(74) *Attorney, Agent, or Firm* — Carlson, Gaskey & Olds, P.C.

(57) ABSTRACT

A liquid fuel rocket engine according to one example includes a combustor, a liquid fuel repository connected to the combustor via a fuel line and a first valve, an oxidizer repository connected to the combustor via an oxidizer line and a second valve, a valve controller configured to output a valve control current to the first valve, the valve controller storing instructions for determining at least one actual minimum impulse bit of a valve based on a current profile and a voltage profile of a single operation of the first valve, and to adjust valve controls to account for the at least one actual minimum impulse bit.

18 Claims, 3 Drawing Sheets

(56) References Cited

U.S. PATENT DOCUMENTS

| | | | |
|---|---|---|---|
| 2015/0330869 A1* | 11/2015 | Ziarno | G01M 15/14 |
| | | | 701/34.4 |
| 2016/0076461 A1* | 3/2016 | Kawai | B64D 37/30 |
| | | | 60/39.463 |
| 2017/0248101 A1 | 8/2017 | Smith et al. | |

OTHER PUBLICATIONS

International Search Report and Written Opinion for International Patent Application No. PCT/US2019/065420 mailed on Aug. 7, 2020.

\* cited by examiner

VALVE TIMING SYSTEM FOR LIQUID FUEL ROCKETS

CROSS-REFERENCE TO RELATED APPLICATION

This application claims priority to International Patent Application No. PCT/US2019/065420 filed on Dec. 10, 2019.

TECHNICAL FIELD

The present disclosure relates generally to valve control, and more specifically to valve timing and controls for reducing minimum impulse bit duration in a liquid fuel rocket.

BACKGROUND

Liquid fuel rockets, as well as other similar systems, utilize valves and valve control to control the flow of fuel into a combustor, thereby controlling the thrust produced by the combustor. During operation of a valve the smallest period of time that the valve is maintained open is referred to as the minimum impulse bit (MIB) and the minimum impulse bit dictates the granularity of control that can be applied to fluid flow through the valve and thus, the granularity of the thrust controls of the liquid fuel rocket engine.

The minimum impulse bit time of any given valve can vary due to variations in the opening and closing responses of the valve. This variance depends on any number factors including the age of the valve, wear on the valve, environmental conditions in which the valve is operating, and the like. In order to compensate for the variation, and provide consistent predictable controls, discrete valve operations are typically run at slightly longer than the actual minimum impulse bit of the valve.

SUMMARY OF THE INVENTION

In one example a valve controller includes at least one current sensor input, at least one voltage sensor input, a processor and a memory, the processor being connected to the at least one current sensor input and the at least one voltage sensor input, wherein the valve controller is configured to determine at least one actual minimum impulse bit of a valve based on a current profile and a voltage profile of a single valve operation, and wherein the valve controller is configured to adjust valve controls to account for the at least one actual minimum impulse bit.

In another example of the previously described valve controller, the actual minimum impulse bit is correlated with at least one external factor, and wherein the valve controller is configured to adjust the valve controls to account for the at least one actual minimum impulse bit and the at least one external factor.

In another example of any of the previously described valve controllers, the external factor is at least one of an engine pressure and battery voltage.

In another example of any of the previously described valve controllers, the valve controller is configured to determine the at least one actual minimum impulse bit on an initial operation of the valve.

In another example of any of the previously described valve controllers, the valve controller is further configured to periodically determine an updated minimum impulse bit of the valve.

In another example of any of the previously described valve controllers, the valve controller is further configured to adjust valve controls based on a most recently determined updated minimum impulse bit of the valve.

In another example of any of the previously described valve controllers, the minimum impulse bit is based in part on an initial valve opening time, the initial valve opening time being determined to be a dip in a ramp up of the current profile.

In another example of any of the previously described valve controllers, the minimum impulse bit is based in part on a fully closed valve time, the fully closed valve time being determined to be a time between a voltage spike and a valve control current being driven to zero by the valve controller.

In another example of any of the previously described valve controllers, the minimum impulse bit is based in part on an initial valve opening time, the initial valve opening time being determined to be a dip in a ramp up of the current profile.

In another example of any of the previously described valve controllers, each of the at least one current sensor and the at least one voltage sensor are connected to, and configured to sense, a valve control signal line.

In another example of any of the previously described valve controllers, the valve control signal line is controllably connected to a liquid fuel rocket engine valve.

In another example of any of the previously described valve controllers, the liquid fuel rocket engine valve at least partially controls a flow of liquid fuel form a fuel repository to a combustor.

One exemplary method for determining a minimum impulse bit of a valve includes monitoring a current profile and a voltage profile of a valve control signal, determining an initial valve open time to be a beginning of a dip in a current ramp up and determining a valve fully closed time to be a voltage spike of the valve control signal, and determining the minimum impulse bit of the valve to be a length of time from the initial valve open time to the valve fully closed time.

Another example of the above method includes correlating the minim impulse bit of the valve with at least one external environmental factor.

In another example of any of the above methods, the at least one external environmental factor includes at least one of an engine pressure and battery voltage.

Another example of any of the above methods includes periodically reiterating the method and updating the determined minimum impulse bit of the valve at each iteration.

A liquid fuel rocket engine according to one example includes a combustor, a liquid fuel repository connected to the combustor via a fuel line and a first valve, an oxidizer repository connected to the combustor via an oxidizer line and a second valve, a valve controller configured to output a valve control current to the first valve, the valve controller storing instructions for determining at least one actual minimum impulse bit of a valve based on a current profile and a voltage profile of a single operation of the first valve, and to adjust valve controls to account for the at least one actual minimum impulse bit.

Another example of the above described liquid fuel rocket engine includes at least one current sensor configured to sense a current profile of the valve control current and at least one voltage sensor configured to sense a voltage profile of the valve control current.

These and other features of the present invention can be best understood from the following specification and drawings, the following of which is a brief description.

DETAILED DESCRIPTION

Figure 1:
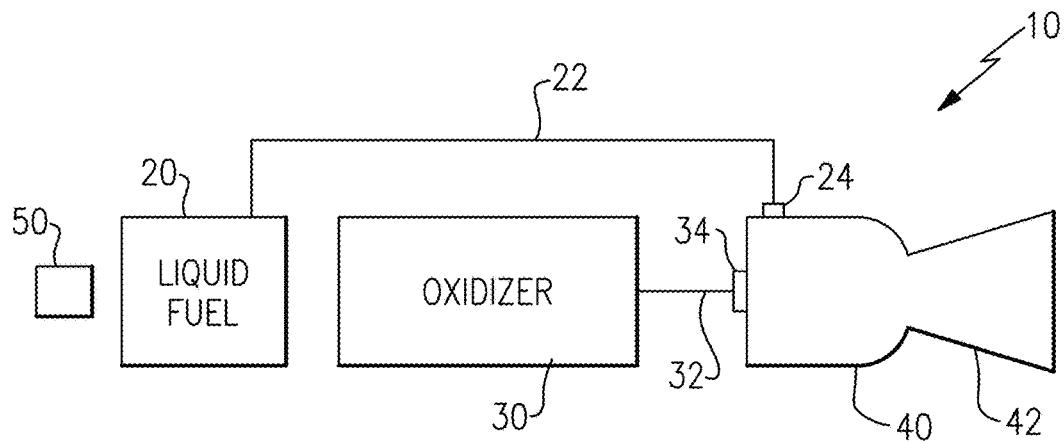
FIG. 1 illustrates a highly schematic exemplary liquid fuel rocket engine.

FIG. 1 schematically illustrates an exemplary highly schematic liquid fuel rocket engine 10. Systems and controls of the engine 10 unrelated to this disclosure are omitted and/or simplified for the purposes of explanation, and a practical liquid fuel rocket engine implementing the concepts described herein can include any number of additional configurations and systems as would be necessary to implement the practical example. The liquid fuel rocket engine 10 includes a liquid fuel repository 20, an oxidizer repository 30 and a combustor 40. The liquid fuel repository 20 is connected to the combustor 40 via a fuel line 22, and a fluid valve 24 controls the flow of liquid fuel into the combustor 40. Similarly, the oxidizer repository 30 is connected to the combustor 40 via a fluid line 32, and the flow of oxidizer into the combustor 40 is controlled via a fluid valve 34. Each of the valves 24, 34 is controlled via a controller 50.

Within the combustor 40, the liquid fuel and the oxidizer are mixed and ignited, and the resultant combustion products are expelled through a nozzle 42 thereby generating thrust. The magnitude of the thrust generated is controlled by the amount of liquid fuel injected into the combustor 40. Due to various conditions, such as wear and environmental conditions, as well as manufacturing variations from valve to valve, the minimum impulse bit of the valve 24 can include variations and fall within a tolerance window. In order to provide the most discrete control possible it is desirable to minimize the variations.

Figure 2:
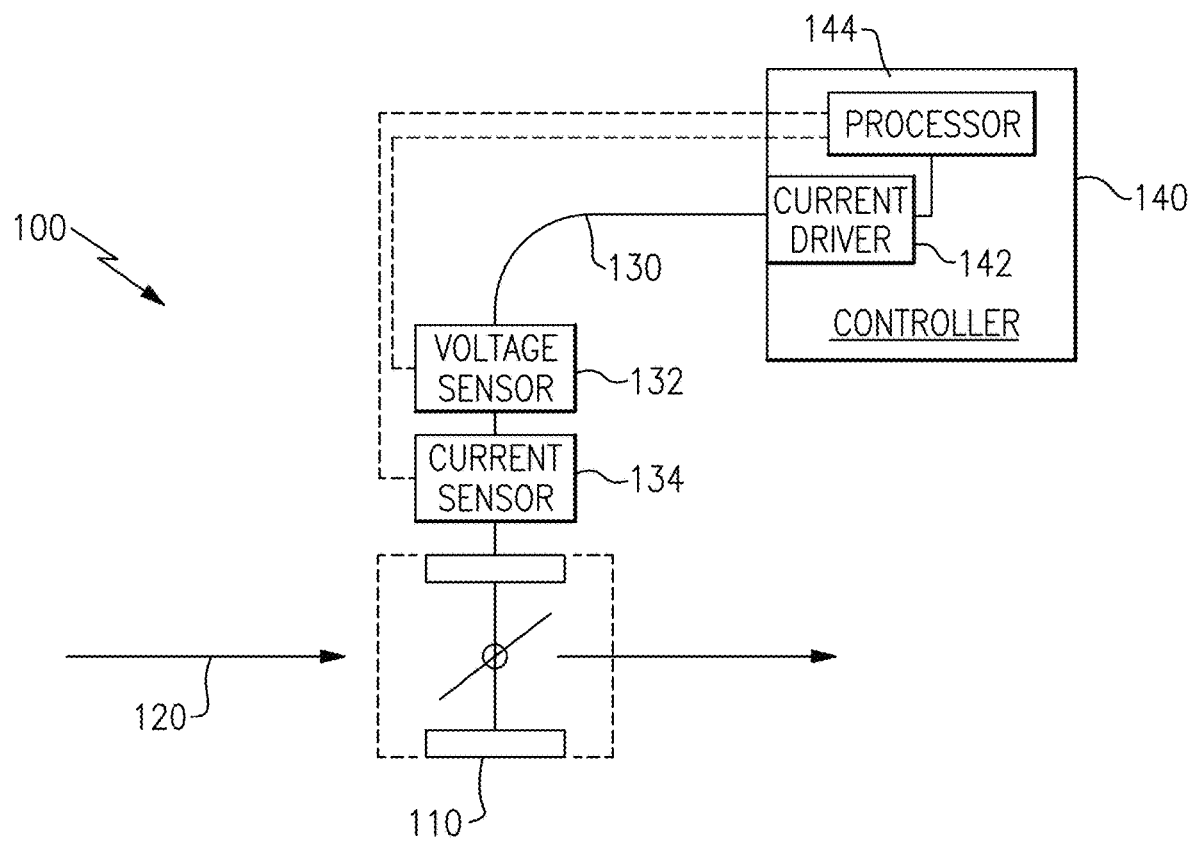
FIG. 2 schematically illustrates an exemplary valve control system for utilization in the liquid fuel rocket engine of FIG. 1.

With continued reference to FIG. 1, FIG. 2 schematically illustrates a valve configuration 100 including an electrically controlled valve 110 that allows a fluid 120 to pass through the valve 110 while the valve 110 is open and prevents the fluid 120 from passing through while the valve 110 is closed. The valve 110 is controlled via a current signal 130. The current signal 130 originates from a current driver 142 portion of a controller 140. A voltage sensor 132 and a current sensor 134 are configured to monitor the voltage and current (respectively) of the current signal 130 being input to the valve 110. The sensor output of each sensor 132, 134 is provided to a processor 144 within the controller 140.

During operation of the valve 110, the control signal 130 is commanded to a high current level to initially open the valve 110, and then dropped to a lower "maintain" level to maintain the valve 110 in the open position for a sufficient time to allow fluid through the valve 110. After the predefined duration, the current signal 130 is driven to zero, and the valve 110 is allowed to close. The total duration from initial opening to fully closed is the minimum impulse bit.

Figure 3:
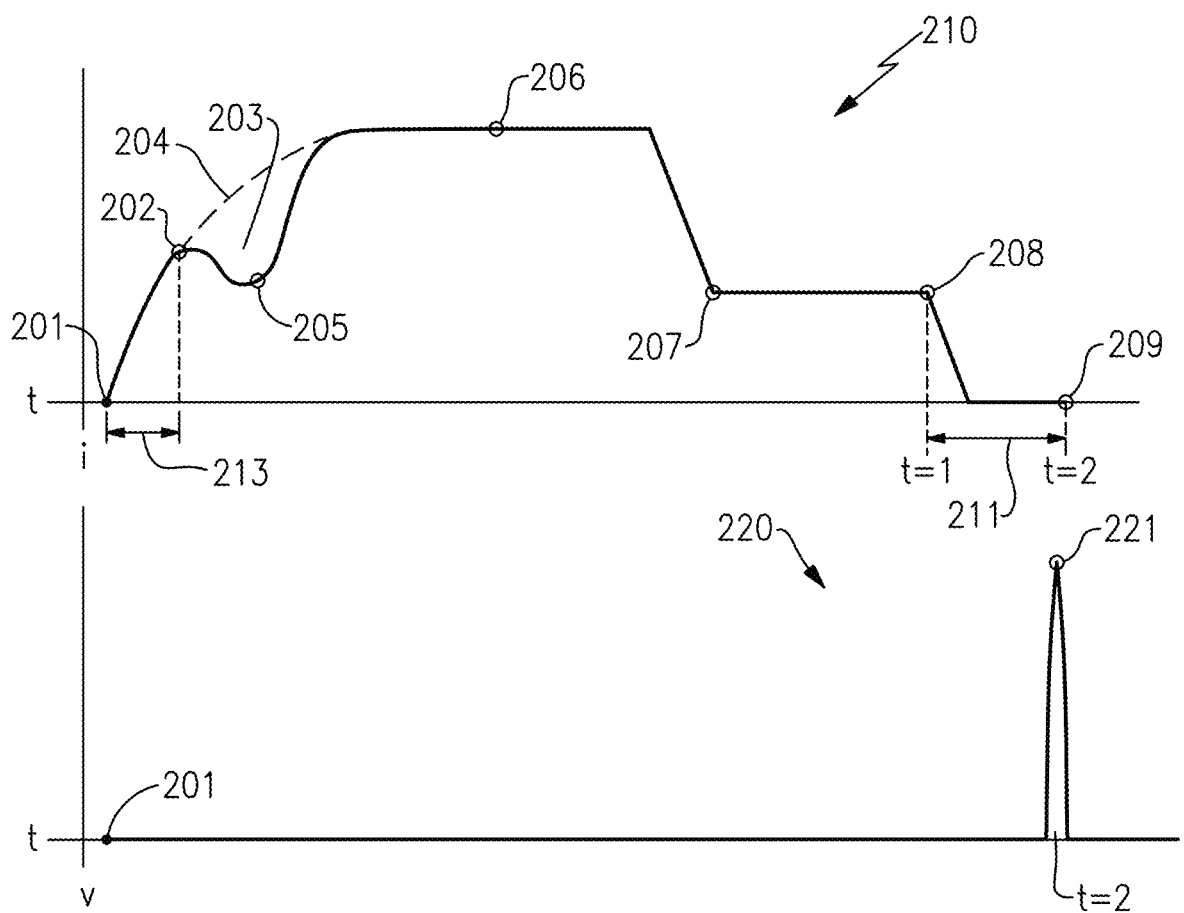
FIG. 3 schematically illustrates a valve timing chart for the valve control system of FIG. 2.
Figure 4:
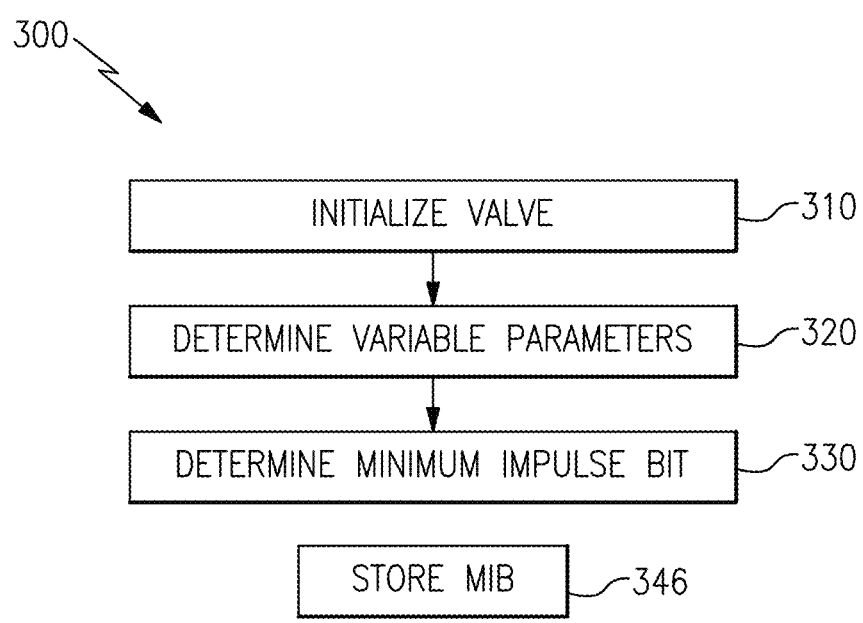
FIG. 4 schematically illustrates a process for operating a valve using experiential timing data to determine a minimum impulse bit of the specific valve.

With continued reference to FIGS. 1 and 2, FIG. 3 illustrates a current (i) profile 210 and a voltage (v) profile 220 of a single exemplary minimum impulse bit with respect to time (t). The current profile 210 and the voltage profile 220 begin at t=0 (point 201), with the controller initiating a control open signal in the form of a steady current ramp up to point 202. At point 202 of the current profile, the valve begins opening, and a current dip 203 occurs. The length of time between the controller beginning to output the open current and the valve beginning to open is referred to as an opening variable time 213. The minimum impulse bit (MIB) is the time period from the time when the valve 24, 34 is fully open (point 205) to the time when the valve 24, 34 is fully closed (point 209).

Dashed line 204 represents the continued current ramp absent the valve opening. The current dip ceases at point 205, which represents the "fully open" position of the valve. The current profile then continues ramping to the maximum current 206 of the open valve control signal, which is held for a predefined duration. After the predefined duration, the controller lowers the control current from the opening control level (at point 206) to a maintain control level at point 207. The maintain control current is held steady until the controller determines that the valve should close at point 208 (t=1). Once the close determination has been made, the controller drives the current to zero amps, causing the valve to close. The valve fully closes a point 209 (t=2).

As the valve does not fully close until some delay after control current has been driven all the way to zero, the controller monitors the voltage sensor signal as well as the current sensor signal. When the valve fully closes, at t=2, a voltage spike 221 occurs. The additional time 211 after the valve has been commanded closed and before the valve is fully closed impacts the minimum bit time, is a cause of variation within the minimum bit time, and is referred to as the close variable time 211.

By monitoring the voltage and the current, the controller can determine the time from when the valve is controlled closed to the time when the valve is actually closed, and the minimum bit time of the valve is determined to be the duration that the controller drove the valve to be open plus the variable time 211, 213.

Existing systems utilize a preset controller on time, and the variable time results in variations of the minimum impulse bit. With continued reference to FIGS. 1-3, FIG. 4 schematically illustrates an exemplary method 300 to determine an exact minimum impulse bit length for a given valve 110. Initially the valve 110 is assembled, installed and provided with a first open/close cycle in an "Initialize Valve" step 310. During the open/close cycle the controller stores the current and voltage profiles 210, 220 (as illustrated in FIG. 3).

Once stored in a memory of the controller, the current profile 210 and the voltage profile 220 are analyzed to determine variable parameters in a "Determine Variable Parameters" step 320. In one example, the variable parameters are the close variable time 211, and the open variable time 213. Once determined the variable times are stored in a controller memory, and the controller determines the minimum impulse bit time in a "Determine Minimum Impulse bit" step 330.

The minimum impulse bit is the length of time from when the valve begins opening to when the valve becomes fully closed and is the time from the initial command on at point 201 to the command off at point 208, plus the variable close time 211, minus the variable on time 213. Once determined, the minimum impulse bit is stored in a "Store MIB" step 340, and the control sequence is adjusted to account for the actual minimum impulse bit of the specific valve.

In some examples, the minimum impulse bit generated via the above process is estimated to be accurate under all conditions for the specific valve, and can be utilized throughout operations of the liquid fuel rocket engine. In alternative examples, such as those where additional control capacity is available, the minimum impulse bit can be recalculated throughout operation of the liquid fuel engine with subsequent valve operations utilizing the most recently determined minimum impulse bit.

In yet another example, the minimum impulse bit can be determined under multiple conditions, such as engine pressure and battery voltage, and the like. In such an example, the determined minimum impulse bits are correlated in the controller with the environmental or other conditions that were present when the minimum impulse bit was determined. Subsequent operations of the valve 110 utilize the minimum impulse bit corresponding to the currently detected conditions of the valve, and can provide more accurate timing with less variation.

While described above with regards to a minimum impulse bit of a liquid fuel rocket engine, it is appreciated that the valve timing systems described herein can be applied to any fluid valve control system and are not limited to liquid fuel rocket engine applications.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A valve controller comprising:
   at least one current sensor input;
   at least one voltage sensor input;
   a processor and a memory, the processor being connected to the at least one current sensor input and the at least one voltage sensor input, wherein the valve controller is configured to determine at least one actual minimum impulse bit of a valve based on a current profile and a voltage profile of a single valve operation, and wherein the valve controller is configured to adjust valve controls to account for the at least one actual minimum impulse bit.

2. The valve controller of claim 1, wherein the actual minimum impulse bit is correlated with at least one external factor, and wherein the valve controller is configured to adjust the valve controls to account for the at least one actual minimum impulse bit and the at least one external factor.

3. The valve controller of claim 2, wherein the external factor is at least one of an engine pressure and battery voltage.

4. The valve controller of claim 1, wherein the valve controller is configured to determine the at least one actual minimum impulse bit on an initial operation of the valve.

5. The valve controller of claim 1, wherein the valve controller is further configured to periodically determine an updated minimum impulse bit of the valve.

6. The valve controller of claim 5, wherein the valve controller is further configured to adjust valve controls based on a most recently determined updated minimum impulse bit of the valve.

7. The valve controller of claim 1, wherein the minimum impulse bit is based in part on an initial valve opening time, the initial valve opening time being determined to be a dip in a ramp up of the current profile.

8. The valve controller of claim 1, wherein the minimum impulse bit is based in part on a fully closed valve time, the fully closed valve time being determined to be a time between a voltage spike and a valve control current being driven to zero by the valve controller.

9. The valve controller of claim 8, wherein the minimum impulse bit is based in part on an initial valve opening time, the initial valve opening time being determined to be a dip in a ramp up of the current profile.

10. The valve controller of claim 1, wherein each of the at least one current sensor and the at least one voltage sensor are connected to, and configured to sense, a valve control signal line.

11. The valve controller of claim 10, wherein the valve control signal line is controllably connected to a liquid fuel rocket engine valve.

12. The valve controller of claim 11, wherein the liquid fuel rocket engine valve at least partially controls a flow of liquid fuel form a fuel repository to a combustor.

13. A method for determining a minimum impulse bit of a valve comprising:
   monitoring a current profile and a voltage profile of a valve control signal;
   determining an initial valve open time to be a beginning of a dip in a current ramp up and determining a valve fully closed time to be a voltage spike of the valve control signal; and
   determining the minimum impulse bit of the valve to be a length of time from the initial valve open time to the valve fully closed time.

14. The method of claim 13, further comprising correlating the minim impulse bit of the valve with at least one external environmental factor.

15. The method of claim 14, wherein the at least one external environmental factor includes at least one of an engine pressure and battery voltage.

16. The method of claim 13, further comprising periodically reiterating the method and updating the determined minimum impulse bit of the valve at each iteration.

17. A liquid fuel rocket engine comprising:
   a combustor;
   a liquid fuel repository connected to the combustor via a fuel line and a first valve;
   an oxidizer repository connected to the combustor via an oxidizer line and a second valve; and
   a valve controller configured to output a valve control current to the first valve, the valve controller storing instructions for determining at least one actual minimum impulse bit of a valve based on a current profile and a voltage profile of a single operation of the first valve, and to adjust valve controls to account for the at least one actual minimum impulse bit.

18. The liquid fuel rocket engine of claim 17, further comprising at least one current sensor configured to sense a current profile of the valve control current and at least one voltage sensor configured to sense a voltage profile of the valve control current.

* * * * *